United States Patent
Price et al.

(10) Patent No.: US 9,591,832 B2
(45) Date of Patent: Mar. 14, 2017

(54) PET AMUSEMENT DEVICE WITH SCRATCHING PAD, INTERIOR BALL, AND PERIMETER BALL TRACK

(71) Applicant: Coastal Pet Products, Inc., Alliance, OH (US)

(72) Inventors: David Price, Miami, OK (US); Todd Stolte, Baxter Springs, KS (US); Kirk Dixon, Claremore, OK (US)

(73) Assignee: Coastal Pet Products, Inc., Alliance, OH (US)

( * ) Notice: Subject to any disclaimer, the term of this patent is extended or adjusted under 35 U.S.C. 154(b) by 121 days.

(21) Appl. No.: 14/625,957

(22) Filed: Feb. 19, 2015

(65) Prior Publication Data

US 2016/0242389 A1    Aug. 25, 2016

(51) Int. Cl.
*A01K 15/02* (2006.01)

(52) U.S. Cl.
CPC .......... *A01K 15/025* (2013.01); *A01K 15/024* (2013.01)

(58) Field of Classification Search
CPC ............................ A01K 15/025; A01K 15/024
See application file for complete search history.

(56) References Cited

U.S. PATENT DOCUMENTS

| | | |
|---|---|---|
| 1,976,234 A | 10/1934 | Larson |
| 2,292,540 A | 8/1942 | Norton |
| 3,486,485 A | 12/1969 | Kahanick |
| 3,502,335 A | 3/1970 | Sholin |
| 3,552,356 A | 1/1971 | Rosenthal |
| 3,648,403 A * | 3/1972 | Gommel ............... A63F 9/0415 119/707 |
| D273,314 S | 4/1984 | McCoy et al. |
| 4,722,299 A | 2/1988 | Mohr |
| D303,713 S | 9/1989 | Kelm et al. |
| 5,009,193 A | 4/1991 | Gordon |
| D335,553 S | 5/1993 | Conner |
| 5,269,261 A | 12/1993 | McCance |
| D345,633 S | 3/1994 | McCance |
| D359,822 S | 6/1995 | McCance |
| 5,517,948 A | 5/1996 | Udelle et al. |
| 5,529,017 A | 6/1996 | Udelle et al. |
| 5,540,187 A | 7/1996 | Udelle et al. |
| 5,544,623 A | 8/1996 | Udelle et al. |
| 5,572,955 A | 11/1996 | Boshears |
| 5,579,725 A | 12/1996 | Boshears |
| 5,680,831 A | 10/1997 | Udelle |
| 5,785,005 A | 7/1998 | Udelle et al. |
| 5,809,938 A | 9/1998 | Baiera et al. |
| D405,563 S | 2/1999 | Baiera et al. |
| 5,881,679 A | 3/1999 | Hann |
| 6,405,692 B1 | 6/2002 | Christiansen |
| D526,029 S | 8/2006 | Ragonetti et al. |

(Continued)

*Primary Examiner* — Monica Williams
*Assistant Examiner* — Jessica Wong
(74) *Attorney, Agent, or Firm* — Renner, Kenner, Greive, Bobak, Taylor & Weber

(57) ABSTRACT

A pet amusement device formed in two halves, with a scratching pad removably attached to one half and an interior space accessible through openings in the second half. A ball with a bell may be contained in the interior space, allowing a pet to reach through the openings to play with the ball. A continuous track may surround the device, and a ball may be contained within the track, allowing the pet to bat the ball around the track.

14 Claims, 3 Drawing Sheets

(56) References Cited

U.S. PATENT DOCUMENTS

| | | | |
|---|---|---|---|
| 7,320,296 | B2 | 1/2008 | Morrison |
| D606,713 | S | 12/2009 | Kellogg et al. |
| 7,806,087 | B2 | 10/2010 | Plante |
| 7,976,355 | B2 | 7/2011 | McAnulty |
| D656,282 | S | 3/2012 | Dixon et al. |
| D662,675 | S | 6/2012 | Siklosi |
| 8,418,657 | B2 | 4/2013 | Dixon et al. |
| D693,972 | S | 11/2013 | Price et al. |
| 2009/0095229 | A1 | 4/2009 | Plante |
| 2010/0058994 | A1 | 3/2010 | Siklosi |
| 2010/0107990 | A1 | 5/2010 | Plante |
| 2012/0192806 | A1* | 8/2012 | Dixon ................. A01K 15/025 119/707 |
| 2014/0338613 | A1* | 11/2014 | Suring ................. A01K 15/025 119/707 |

* cited by examiner

PET AMUSEMENT DEVICE WITH SCRATCHING PAD, INTERIOR BALL, AND PERIMETER BALL TRACK

CROSS REFERENCE

Not Applicable.

BACKGROUND OF THE INVENTION

Field of the Invention

This invention relates generally to a pet amusement device, and more particularly, but not by way of limitation, to a pet amusement device with a scratching pad, an interior ball, and a perimeter ball track.

Description of the Related Art

Pets, particularly cats, enjoy batting balls about. Pet amusement devices proving a contained area in which a ball or other toy may be batted, such as a continuous track or a chamber, are particularly desirable.

Furthermore, it is well known that animals such as cats have a natural instinct that requires them to scratch or claw objects. Because of this, oftentimes, furniture and other household objects are damaged and destroyed despite training the cats.

Based on the foregoing, it is desirable to provide a pet amusement device that combines a ball or other toy in a continuous track, a ball or other toy in a chamber, and a scratching pad.

SUMMARY OF THE INVENTION

In general, in a first aspect, the invention relates to a pet amusement device comprising a first half with a center portion and a first projection and a second half with a center portion and a second projection, where the first projection and the second projection form a continuous track surrounding the center portion of the first half and the center portion of the second half when the first half is attached to the second half. A toy, such as a ball, may be contained within the continuous track such that the toy may travel along the continuous track. The continuous track may have at least one opening such that the continuous track and the toy contained within the continuous track are accessible through the at least one opening.

The first projection and the second projection may each have an edge and the at least one opening along the continuous track may be a continuous space between the edge of the first projection and the edge of the second projection. Tithe continuous track may have an arcuate cross-section. The toy may have a width and the continuous track may have a width greater than the width of the toy. The at least one opening along the continuous track may have a width that is smaller than the width of the toy, such that the toy may freely travel along the continuous track but may not be easily removed from the continuous track through the at least one opening.

The second half may have one or more tabs and the first half may have one or more openings or indentations such that the one or more tabs of the second half may be inserted into the one or more openings or indentations of the first half to attach the first half to the second half.

The pet amusement device may further comprise a space between the center portion of the first half and the center portion of the second half. The space may be defined by a wall extending downward from the first half, a wall extending upward from the second half and aligning with the first half, the center portion of the first half, and the center portion of the second half when the first half is attached to the second half. The pet amusement device may further comprise at least one riser extending from the center portion of the second half to the center portion of the first half to prevent the space from collapsing. The pet amusement device may further comprise a second toy contained within the space between the center portion of the first half and the center portion of the second half. The second toy may be a ball, which may house a bell. The pet amusement device may further comprise one or more openings in the center portion of the second half such that an animal may reach through the one or more openings to play with the second toy. The second toy may have a width, and the space may have a height greater than the width of the second toy. The one or more openings in the center portion may each have a width that is smaller than the width of the second toy, such that the second toy may freely travel within the space but may not be easily removed from the space through the one or more openings.

The center portion of the first half may comprise a receptacle having an open top, and the device may further comprise a removable scratching pad receivable in the receptacle. The first half may have a top and a bottom, where the first half attaches to the second half on the bottom of the first half. The receptacle may be defined by a rim extending upward from the top of the first half. The rim may have one or more tabs extending inward to temporarily hold the scratching pad in place within the receptacle.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
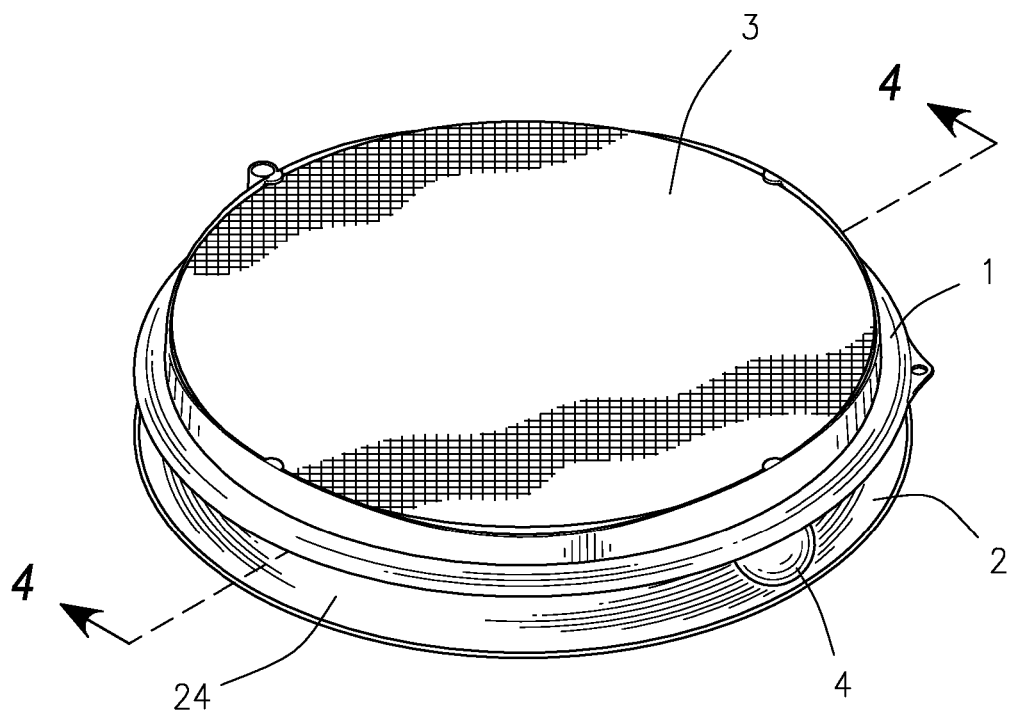
FIG. 1 is a perspective view of the top of the pet amusement device.
Figure 2:
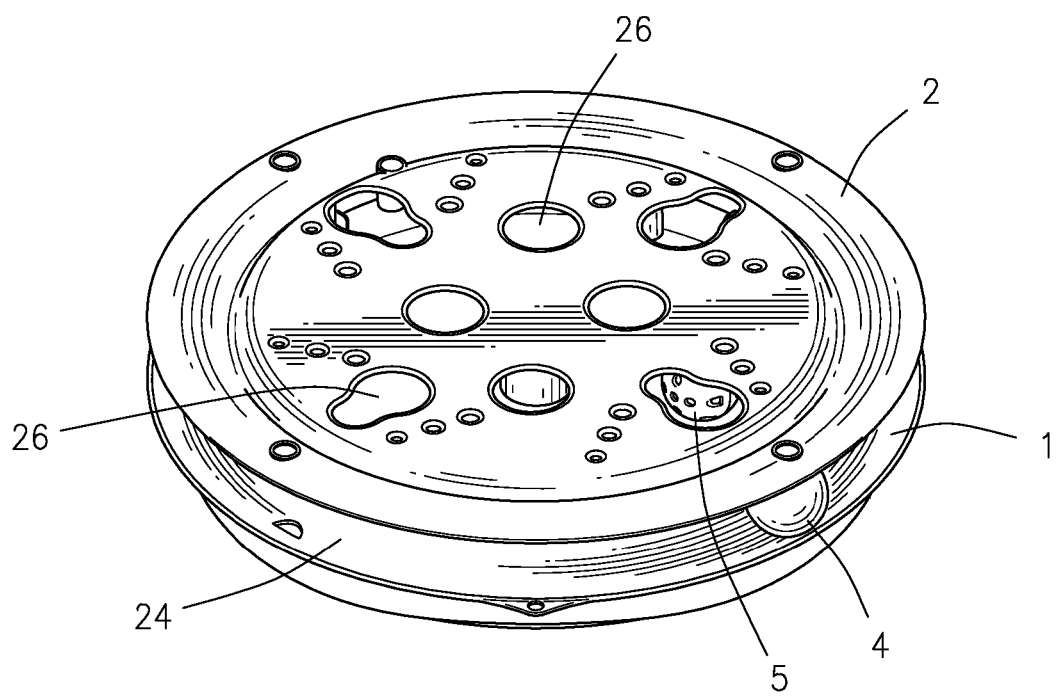
FIG. 2 is a perspective view of the bottom of the pet amusement device.

In general, in a first aspect, the invention relates to a pet amusement device comprising a first half 1 and a second half 2. The pet amusement device may also comprise a scratching pad 3 and two toys 4 and 5, as shown in FIGS. 1 and 2.

Figure 3:
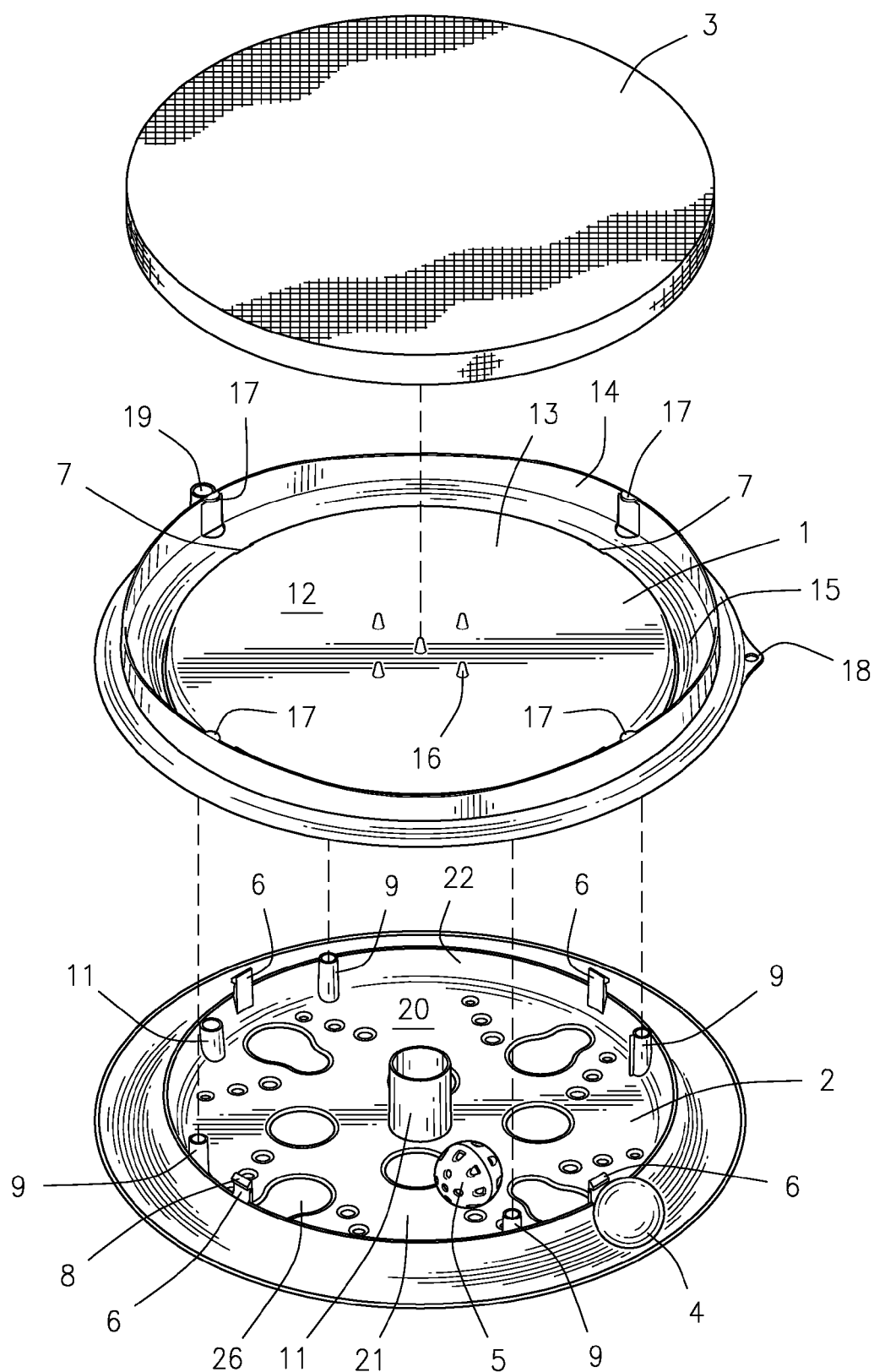
FIG. 3 is an exploded view of the pet amusement device.
Figure 4:
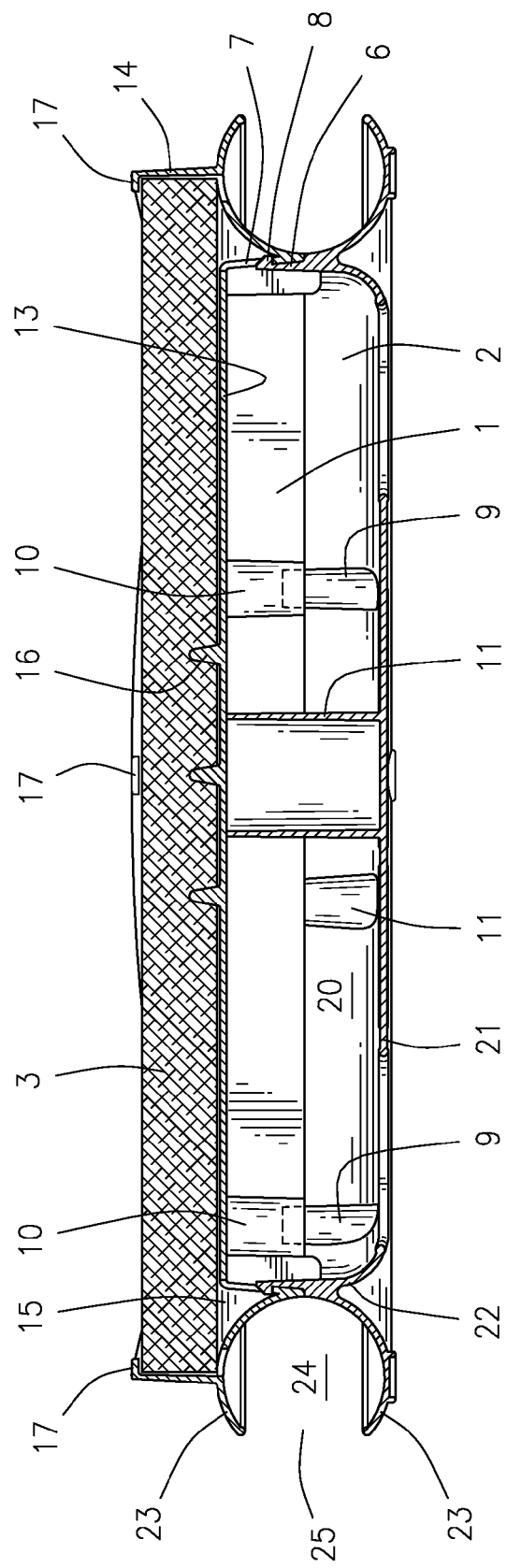
FIG. 4 is a side cross section view of the pet amusement device.

The first half 1 and the second half 2 may attach together to form the pet amusement device, as shown in the FIGS. 3 and 4. Both the first half 1 and the second half 2 may be generally circular and may have the same diameter. The second half 2 may have one or more tabs 6 and the first half 1 may have one or more corresponding openings 7 for receiving the tabs 6. Each tab 6 may have a lip 8, which may be angled on top and flat on bottom. Each lip 8 and the opening 7 corresponding to the tab 6 of which the lip 8 is a part may be sized and positioned such that the lip 8 projects past the opening 7 when the first half 1 and the second half 2 are aligned. As such, when the first half 1 is pressed against the second half 2 with the openings 7 positioned over the tabs 6, the angled tops of the lips 8 may cause the tabs 6 to deform sufficiently for the lips 8 to clear the openings 7 before returning to their normal positions once the lips 8 are through the openings 7, causing the lips 8 to be located on the opposite side of the first half 1 than the second half 2. The flat bottoms of the lips 8 may prevent the tabs 6 from disengaging with the openings 7 without being manually deformed. Through this process, the first half 1 and the second half 2 may be snapped together for use.

The second half 2 may additionally or alternately have one or more posts 9 and the first half 1 may have one or more posts 10 into which the posts 9 may be receivable. The posts 9 and 10 may fit snugly, thus attaching the first half 1 to the second half 2 through friction fit. Additionally or alternatively, the openings in posts 10 into which the posts 9 are receivable may be of a sufficient depth that lips 8 of the tabs 6 may clear the openings 7, but cannot travel further. In other words, the posts 9 and 10 may prevent the first half 1 and the second half 2 from being pressed more closely together. One or more risers 11 may extend upward from the second half 2 to similarly maintain a distance between the first half 1 and the second half 2.

Additionally or alternatively, the first half 1 and the second half 2 may be secured together via additional or alternate areas of friction fit, adhesive, other attachment devices, or any combination of the foregoing.

The first half 1 may have a receptacle 12 on the side opposite the side that is adjacent to the second half 2. The receptacle 12 may have a generally flat bottom 13, an upstanding rim 14, and an open top. The generally flat bottom 13 may be raised, such that a generally circular recess 15 may be located between the bottom 13 and the rim 14. The openings 7 may be located inside the rim 14 either on the flat bottom 13 or in the recess 15 if the bottom 13 is raised, as shown. The scratching pad 3 may be receivable in the receptacle 12. Thus, the scratching pad 3 may have a slightly smaller diameter than the receptacle 12, allowing the scratching pad 3 to be placed inside the receptacle 12. One or more pegs 16 may extend from the flat bottom 13 to support the scratching pad 3. One or more lips 17 may extend inwardly from the rim 14 to prevent the scratching pad 3 from being removed without force from the receptacle 12 once it is in place. Thus, the scratching pad 3 may have to be pushed into place inside the receptacle 12, forcing the scratching pad 3 to temporarily deform at the locations of the lips 17, and allowing the lips 17 to hold the scratching pad 3 in place until the user desires to remove it.

The first half 1 may have a point of attachment 18, such as a projection with a hole through it, by which the pet amusement device may be hung. The first half 2 may have an opening 19 into which an accessory or other attachment may be receivable.

The second half 2 may have an interior space or chamber 20. This chamber 20 may be located on the same side of the second half 2 that is adjacent the first half 1, such that the interior chamber 20 is located between the first half 1 and the second half 2. The chamber 20 may have a generally flat floor 21, an upstanding wall 22 extending upward from the floor 21, and an open top when the second half 2 is separated from the first half 1. The first half 1 may cover the open top when the first half 1 is attached to the second half 2. The tabs 6 discussed above may extend upward from the wall 22. The posts 9 may be integral to and/or adjacent to the wall 22. Each of the risers 11 may be integral to and/or adjacent to the wall 22 and/or may extend upward from the floor 21. For example, one riser 11 may be adjacent to the wall 22 and extend from the floor 21 while another riser 11 may extend upward from the center of the floor 21, as shown in FIG. 3. The riser 11 in the center of the floor 21 may prevent the floor 21 of the second half 2 and the bottom 13 of the first half 1 from collapsing against each other and reducing the size of the interior chamber 20.

The first half 1 and the second half 2 may each have a curved projection 23 extending laterally outward along their respective perimeters such that the curved projections 23 of the two halves 1 and 2 form a continuous track 24 around the perimeter of the pet amusement device when the two halves 1 and 2 are attached together. The continuous track 24 may have an arcuate cross-section, as seen in FIG. 4. The toy 4 may be contained within the continuous track 24 such that the toy 4 may freely travel along the continuous track 24. The toy 4 may be a ball with a typical spherical shape or may have any other shape that allows the toy 24 to roll or slide along the continuous track 24. The continuous track 24 may be generally circular or may have any other appropriate shape that allows the toy 4 to travel along the continuous track 24.

The curved projections 23 may be sized to leave one or more openings 25 such that the continuous track 24 and any toy 4 contained within the continuous track 24 may be accessible through the openings 25 such that a cat or other animal may bat the toy 4 around the continuous track 24 and watch it travel around and around the continuous track 24. The openings 25 may be a single continuous longitudinal opening along the side of the device, as shown in the Figures. The openings 25 may be of sufficient width to allow the paw of a cat or other animal to fit through the openings 25. The width of the openings 25 may be slightly smaller than the width of the toy 4. Thus, the toy 4 may freely roll or slide along the continuous track 24 but may not be easily removed from the continuous track 24 through the openings 25. The device may be made of a slightly flexible material such that the projections 23 may be deformed slightly to allow insertion or removal of the toy 4. Alternately, the device may be made of a rigid material, necessitating the separation of the first half 1 from the second half 2 for the insertion or removal of the toy 4.

A second toy 5 may be located within the interior recess 20 between the first half 1 and the second half 2. The second toy 5 may be sized such that it may travel freely within the chamber 20. The second toy 5 may be a ball with a typical spherical shape or may have any other shape. The second toy 5 may house a bell and may have one or more openings to allow the sound of the bell to be heard outside the toy 5. The floor 21 of the second half 2 may have one or more openings 26 to allow a cat or other animal to bat the toy 5 around within the interior chamber 20. The openings 26 may be of sufficient width to allow the paw of a cat or other animal to fit through the openings 26, but slightly smaller than the width of the toy 5, allowing the cat or other animal to play with the toy 5 but preventing the toy 5 from falling out of the device.

During use, the device may be placed with the first half 1 up, allowing the pet access to the scratching pad 3, or second half 2 up, allowing the pet access to the openings 26 to access the toy 5. In either orientation, the pet may access the toy 4 in the track 24 around the perimeter of the device.

Whereas, the devices and methods have been described in relation to the drawings and claims, it should be understood that other and further modifications, apart from those shown or suggested herein, may be made within the spirit and scope of this invention.

What is claimed is:

1. A pet amusement device comprising: a first half with a center portion and a first projection; a second half with a center portion and a second projection, where the first projection and the second projection form a continuous track surrounding the center portion of the first half and the center portion of the second half when the first half is attached to the second half; a toy contained within the continuous track such that the toy may travel along the continuous track; at least one opening along the continuous track such that the continuous track and the toy contained within the continuous track are accessible through the at least one opening; a space between the center portion of the first half and the center portion of the second half; wherein a second toy is contained within the space between the center portion of the first half and the center portion of the second half; and further comprising one or more openings in the center portion of the second half such that an animal may reach through the one or more openings to play with the second toy.

2. The pet amusement device of claim 1 where the toy is a ball.

3. The pet amusement device of claim 1 where the first projection and the second projection each have an edge and where the at least one opening along the continuous track is a continuous space between the edge of the first projection and the edge of the second projection.

4. The pet amusement device of claim 1 where: the continuous track has an arcuate cross-section; the toy has a width; the continuous track has a width greater than the width of the toy; and the at least one opening along the continuous track has a width that is smaller than the width of the toy, such that the toy may freely travel along the continuous track but may not be easily removed from the continuous track through the at least one opening.

5. The pet amusement device of claim 1 where the second half has one or more tabs and the first half has one or more openings or indentations such that the one or more tabs of the second half may be inserted into the one or more openings or indentations of the first half to attach the first half to the second half.

6. The pet amusement device of claim 1 where the space is defined by a wall extending downward from the first half, a wall extending upward from the second half and aligning with the first half, the center portion of the first half, and the center portion of the second half when the first half is attached to the second half.

7. The pet amusement device of claim 6 further comprising at least one riser extending from the center portion of the second half to the center portion of the first half to prevent the space from collapsing.

8. The pet amusement device of claim 1 wherein the second toy is a ball.

9. The pet amusement device of claim 8 where the ball houses a bell.

10. The pet amusement device of claim 1 where: the second toy has a width; the space has a height greater than the width of the second toy; and the one or more openings in the center portion each have a width that is smaller than the width of the second toy, such that the second toy may freely travel within the space but may not be easily removed from the space through the one or more openings.

11. The pet amusement device of claim 1 where the center portion of the first half comprises a receptacle having an open top, the device further comprising a removable scratching pad receivable in the receptacle.

12. The pet amusement device of claim 11 where the first half has a top and a bottom, where the first half attaches to the second half on the bottom of the first half, and where receptacle is defined by a rim extending upward from the top of the first half.

13. The pet amusement device of claim 12 where the rim has one or more tabs extending inward to temporarily hold the scratching pad in place within the receptacle.

14. A pet amusement device comprising: a first half with a center portion and a first projection; a second half with a center portion and a second projection, where the first projection and the second projection form a continuous track with an arcuate cross-section surrounding the center portion of the first half and the center portion of the second half when the first half is attached to the second half; a toy contained within the continuous track such that the toy may travel along the continuous track; at least one opening along the continuous track such that the continuous track and the toy contained within the continuous track are accessible through the at least one opening; a space between the center portion of the first half and the center portion of the second half; a second toy contained within the space between the center portion of the first half and the center portion of the second half; one or more openings in the center portion of the second half such that an animal may reach through the one or more openings to play with the second toy; a receptacle having an open top in the center portion of the first half; and a removable scratching pad receivable in the receptacle.

* * * * *